(12) United States Patent
Thompson

(10) Patent No.: US 7,080,024 B2
(45) Date of Patent: Jul. 18, 2006

(54) METHOD, SYSTEM, AND COMPUTER SOFTWARE PROGRAM PRODUCT FOR ANALYZING THE EFFICIENCY OF A COMPLEX PROCESS

(76) Inventor: Daniel J. Thompson, 116 Pinecrest Rd., Durham, NC (US) 27705

( * ) Notice: Subject to any disclaimer, the term of this patent is extended or adjusted under 35 U.S.C. 154(b) by 0 days.

(21) Appl. No.: 11/303,634

(22) Filed: Dec. 16, 2005

(65) Prior Publication Data

US 2006/0095311 A1 May 4, 2006

Related U.S. Application Data

(62) Division of application No. 09/742,719, filed on Dec. 21, 2000.

(60) Provisional application No. 60/228,949, filed on Aug. 28, 2000.

(51) Int. Cl.
*G06Q 99/00* (2006.01)
(52) U.S. Cl. ............................................. 705/8; 705/9
(58) Field of Classification Search .................. 705/8, 705/9
See application file for complete search history.

(56) References Cited

U.S. PATENT DOCUMENTS

| | | | | |
|---|---|---|---|---|
| 5,111,391 | A * | 5/1992 | Fields et al. .................... | 705/9 |
| 5,325,292 | A * | 6/1994 | Crockett ......................... | 705/9 |
| 5,406,476 | A * | 4/1995 | Deziel et al. .................. | 705/8 |
| 5,799,286 | A * | 8/1998 | Morgan et al. ................ | 705/30 |
| 6,249,715 | B1 * | 6/2001 | Yuri et al. .................. | 700/111 |
| 6,574,605 | B1 * | 6/2003 | Sanders et al. ................ | 705/8 |

FOREIGN PATENT DOCUMENTS

EP 0603513 A2 * 11/1993

OTHER PUBLICATIONS

Krieg et al. "Integrating Technology to Increase Application Development Productivity." Journal of Systems Management, vol. 40, No. 8, p. 6(9), Aug. 1989.*
Duncan et al. "A New Servicing Cost Study." Mortgage Banking, vol. 59, No. 1, pp. 114-125, Oct. 1998.*
Anton et al. "Best Practices for Customer Service Call Centers—An Exclusive Statistical Study." Telemarketing & Call Center Solutions, vol. 15, No. 10, pp. 80-88, Apr. 1997.*

(Continued)

*Primary Examiner*—Susanna M. Diaz
(74) *Attorney, Agent, or Firm*—Alston & Bird LLP

(57) ABSTRACT

A method of analyzing a workload schedule compared to available resources is provided. Projects comprising a process with at least one task are identified. A work time for each task is determined, including a greatest hands-on work time task. An effort equivalence (EE) for each task is determined by normalizing each task work time to the greatest hands-on work time. The projects are arranged so each task is at least partially performed in one interval. An apportionment of EE's is determined, as well as a total EE (TEE) for each interval. Each TEE is compared to a historical maximum EE volume (HMEEV) to evaluate the workload schedule compared to the available resources. Where a TEE exceeds the HMEEV, the projects are modified to reapportion the TEE's for a more efficient utilization of available resources compared to the workload schedule. A related method, system, and computer program product are also provided.

39 Claims, 6 Drawing Sheets

OTHER PUBLICATIONS

Casteuble, Tracy. "How Associations are Taking to Technology." Association Management, vol. 49, No. 12, pp. 43-48, 105, Nov. 1997.*

Hall et al. "Optimize Your Call Center Through Simulation." Call Center Solutions, vol. 17, No. 3, pp. 54-59, Sep. 1998.*

* cited by examiner

Fixed Cost Business Model of Complex Service Provider

Sponsor's Cost of Outsourcing

Determination of Outsourcing Cost-Value

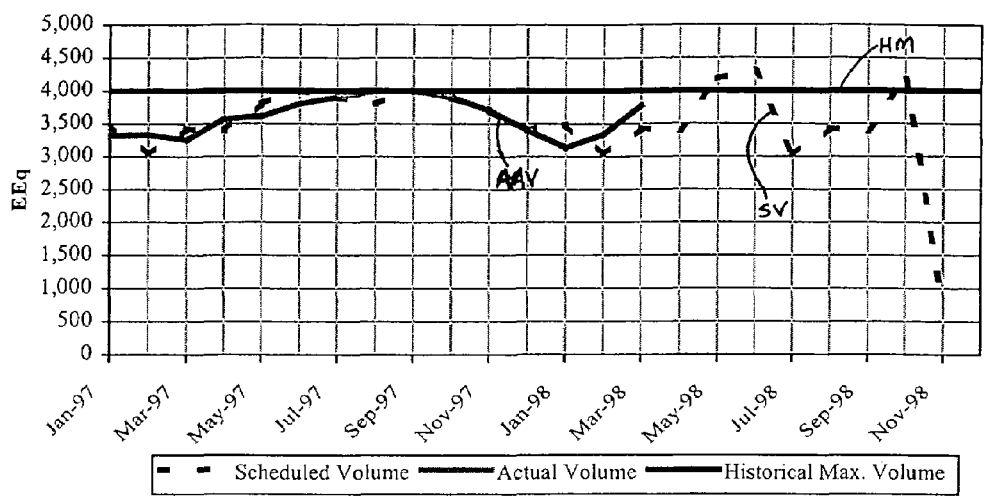
Figure 5: Operation workload schedule in terms of EEq Volume
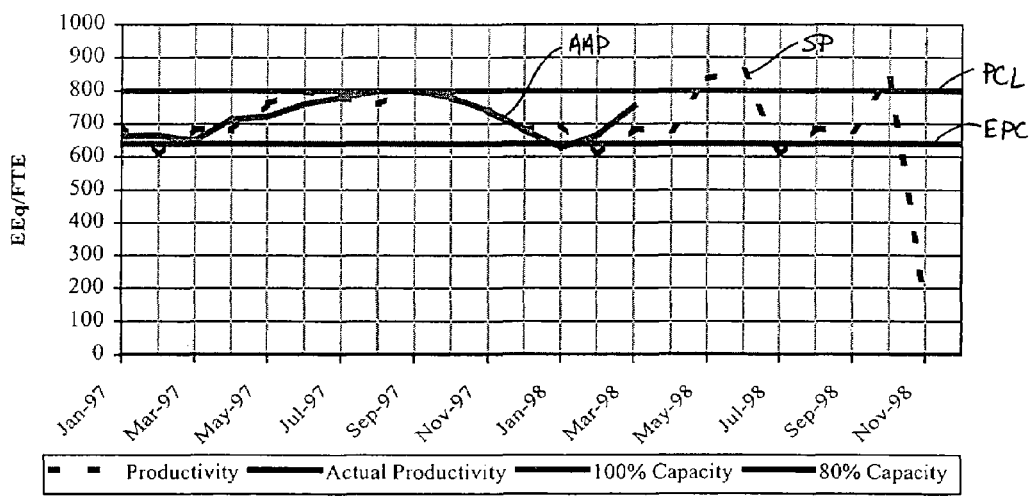
Figure 7: Analysis of Productivity

METHOD, SYSTEM, AND COMPUTER SOFTWARE PROGRAM PRODUCT FOR ANALYZING THE EFFICIENCY OF A COMPLEX PROCESS

CROSS-REFERENCE TO RELATED APPLICATIONS

This application is a divisional of U.S. application Ser. No. 09/742,719, filed Dec. 21, 2000, which claims the benefit of U.S. Provisional Application No. 60/228,949, filed Aug. 28, 2000. Both applications are incorporated by reference herein in their entirety.

FIELD OF THE INVENTION

The present invention relates to management systems and, more particularly, to a method, system, and computer software program product for analyzing a workload schedule, with respect to available resources, the productivity, and the corresponding cost-value, of a complex process so as to determine the efficiency thereof.

BACKGROUND OF THE INVENTION

In a management process for a multi-task/multi-project business operation, many complex and often interdependent decisions are routinely required in order to properly manage the workload and the resources of the business. For example, workload schedules must be projected and managed, production must be tracked, resources must be monitored to maintain availability, internal resources must be shared in a fluid manner between operational groups, and decisions regarding outsourcing of some or all of the pending work may have to be performed in order to maintain cost efficiency.

More particularly, such business operations may include, for example, laboratory operations in the environmental or pharmaceutical field, where such a parameter as workload input to multi-tasks and/or multi-projects may be a critical aspect of successfully running the laboratory. In such an instance, other parameters may be used to approximate the appropriate level of work input. For example, periodic revenue may be used to approximate the required "work effort" to complete the scheduled workload. However, the approximation may be affected by fluctuations in the market pricing of the services, thereby causing inconsistencies in the analysis of the process. In addition, no direct measure of work effort is used or becomes available for subsequent application to workload and resource management functions.

In contrast to a simple approximation for managing workload and process resources, other processes for workload management may require the creation of "Work Breakdown Structures" (WBS), wherein a detailed understanding of the interdependencies and relationships of all tasks, projects, and resources is required in order to effect a management process thereby. However, such WBS process are often cumbersome and require inordinate and impractical amounts of overhead to apply in complex multi-task/multi-project operational environments.

The complexity of managing a multi-task/multi-project operational environment can be illustrated by example where a Contract Research Organization (CRO), such as an independent pharmaceutical testing laboratory or, more generally, a service provider, develops a management process in light of competition from other CRO's and the pricing of outsourced projects by the pharmaceutical companies, or sponsors, as the result of such competition. In such an instance, the revenues for the CRO may be analyzed through a relationship with the direct outsourcing cost for the pharmaceutical company. Accordingly, companies, or business units within a company, that provide complex services are typically fixed-cost entities, wherein the majority of the business costs are independent of the work volume or the amount of service provided. An example of such a business model is shown, for example, in FIG. 1.

In a primary analysis, a CRO experiences fixed costs which typically include, for example, equipment depreciation, personnel costs, and facility costs. These fixed costs accrue regardless of whether a service is provided. When the CRO provides a service, such as an outsourced project from a pharmaceutical company, revenue is accrued, in addition to corresponding variable costs comprising materials and supplies necessary to perform the service, as the volume of work increases. As revenue and variable costs are analyzed as a function of the work volume, it is apparent that the accrued revenue increases at a greater rate than the variable costs, wherein the slope of the revenue line represents the cost to the sponsor (pharmaceutical company) in proportion to the work volume or, in other words, the price charged by the CRO. Accordingly, the CRO will eventually generate net income or profit if high enough levels of productivity are achieved, whereby the work volume increases without an increase in the fixed costs associated with the CRO. It follows that increased productivity on the part of the CRO leads to greater income or profit. Such increased productivity may be achieved, for example, by increasing the work volume without increasing the fixed costs. Alternatively, if the CRO is able to charge a higher price for the provided services, an increased slope in the revenue line will result, whereby the net income increases at a higher rate as the work volume increases.

As mentioned, the revenue for the service provider corresponds to the outsourcing cost for the sponsor, as shown in FIG. 2. Accordingly, if no work is outsourced, no cost accrues to the sponsor. It follows that the cost of outsourcing can subsequently be compared to the cost of performing the same work with the sponsor's internal operations. However, since the sponsor's internal operation typically also functions as a fixed cost operation, it can be analyzed by the same fixed cost business model as shown in FIG. 1. As shown in FIG. 3, the revenue line (or service provider's price) from the service provider's fixed cost model corresponds to the sponsor's cost of outsourcing and, thus can be overlaid on the sponsor's fixed cost internal operation model. In light of this correspondence, the sponsor's relative cost-value of outsourcing an amount of work as compared to performing the work with internal operations (in-house) can be analyzed.

As shown in FIG. 3, the cost-value of outsourcing is defined as the difference between the cost of outsourcing a unit of work volume WV and the cost of performing the same unit of work volume WV in-house. Accordingly, where internal productivity levels are sufficiently high, the sponsor's cost of performing the unit of work volume WV in-house would be less than the cost of outsourcing, thereby resulting in a positive cost-value. It follows that, if the sponsor's internal operation is unable to achieve sufficient levels of productivity because of, for example, the inability to utilize existing capacity or poor operational efficiency, the sponsor's cost of performing the unit of work volume WV in-house would be greater than the cost of outsourcing, thereby resulting in a negative cost-value.

As such, as further shown in FIG. 3, the minimum level of work volume necessary for the sponsor's internal operation to break even occurs at the intercept of the "Total Sponsor Outsourcing Cost" line, Y=(SOC/WV)(X), and the "Total Sponsor Internal Cost" line, Y=(SVC/WV)(X)+SFC. Accordingly, the minimum necessary work volume occurs where X=SFC/((SOC−SVC)/WV). However, the derivation of this fundamental relationship leaves many open issues as to how to best apply this principle to an actual organization. For example, the sponsor must determine if the sponsor's internal operation is sufficiently sized for the routinely available work volume. In addition, the sponsor must discern which of the tasks comprising the work volume have a sufficiently low outsourcing cost to warrant outsourcing the those tasks. Further, for example, the sponsor will need to determine the maximum price to negotiate with the service provider in order to justify outsourcing tasks. Still further, the sponsor must have a method of determining the cost-value performance of its internal operations on a periodic basis in order to optimize the business process.

Thus, there exists a need for a method of applying the derived economic relationship to practical operational situations. Such a method should provide a level of precision greater than a gross approximation that uses, for example, a single variable such as periodic revenue. However, the method should be less cumbersome than other methods requiring the development of complex Work Breakdown Structures (WBS) from intimate knowledge of the complexities of the process. The method should also be readily adapted and expeditiously applied to a variety of businesses following a fixed cost model, without requiring intimate familiarity with the processes involved. Such a method should also be able to readily account for changing situations, without requiring constant monitoring of the tasks attendant to the operation's processes.

SUMMARY OF THE INVENTION

The above and other needs are met by the present invention which, in one embodiment, provides a method of analyzing a workload schedule for a complex process with respect to resources available therefor. First, a plurality of projects comprising the complex process are identified, wherein each project has a start date and a cycle time and further comprises at least one task. A hands-on work time required for each task is then determined, wherein the tasks include a task requiring a greatest hands-on work time. An effort equivalence for each task is thereafter determined by normalizing each task hands-on work time with respect to the task hands-on work time of the task requiring the greatest hands-on work time. Once a calendar having intervals is defined, the projects are arranged according to the start date and the cycle time and with respect to the calendar such that each task is at least partially performed in one of the intervals. An apportionment of the effort equivalences is then determined for the intervals corresponding to the tasks at least partially performed in respective intervals. A total effort equivalence for each interval is then determined, with the total effort equivalence corresponding to the sum of the effort equivalence apportionment for the tasks at least partially performed in that interval. The total effort equivalence for each interval is subsequently compared to a historical maximum effort equivalence volume so as to evaluate the workload schedule with respect to the available resources. Thereafter, where the total effort equivalence for an interval exceeds the historical maximum effort equivalence volume, the projects are modified so as to reapportion the total effort equivalences such that the total effort equivalence for each interval is no greater than the historical maximum effort equivalence volume. A relatively more efficient utilization of the available resources with respect to the workload schedule is thereby provided.

Another advantageous aspect of the present invention comprises a method of analyzing productivity within a complex process with respect to a workload schedule being performed by a total production full-time equivalent (FTE) worker headcount. A plurality of projects comprising the complex process is first identified, with each project having a start date and a cycle time, and further comprising at least one task. A hands-on work time required for each task is then determined, wherein the tasks include a task requiring a greatest hands-on work time. An effort equivalence for each task is thereafter determined by normalizing each task hands-on work time with respect to the task hands-on work time of the task requiring the greatest hands-on work time. After defining a calendar having intervals, the projects are arranged according to the start date and the cycle time and with respect to the calendar such that each task is at least partially performed in one of the intervals. An effort equivalence apportionment is then determined for the intervals, wherein the apportionment corresponds to the tasks at least partially formed in respective intervals. Subsequently, a total effort equivalence for each interval is determined, wherein the total effort equivalence corresponds to the sum of the effort equivalence apportionment for the tasks at least partially performed in that interval. Thereafter, a productivity measure for a productivity measurement period is determined by dividing the total effort equivalence by the total production FTE worker headcount and the productivity measurement period, wherein the productivity measurement period comprises at least a portion of an interval. The productivity measure is then compared to a productivity capacity limit over the productivity measurement period, wherein the productivity capacity limit comprises at least a percentage of a historical maximum productivity capacity with respect to the resources available therefor. The workload schedule is thereby evaluated with respect to an empirical personnel capacity for the tasks comprising the projects. Where the productivity measure exceeds the productivity capacity limit for the productivity measurement period, the projects are modified such that the productivity measure over the productivity measurement period is no greater than the productivity capacity limit. A relatively more efficient utilization of the empirical personnel capacity for the tasks comprising the projects with respect to the workload schedule is thereby provided.

Other advantageous aspects of the present invention comprise a system, further comprising a computer device, and a computer software program product capable of being executed within a computer device, wherein both aspects are configured according to, and are capable of implementing, both a method of analyzing a workload schedule for a complex process with respect to the resources available therefor, and a method of analyzing productivity within a complex process with respect to a workload schedule being performed by a total production FTE worker headcount, respectively, as described herein. Such computer devices may be implemented in computer hardware, or a combination of computer software and hardware, having one or more processing portions for accomplishing an associated method according to embodiments of the present invention. Accordingly, a computer device may comprise, for example, a desktop personal computer, a laptop personal computer, a server, a router, a mainframe computer, or like devices or combinations thereof capable of implementing the described functions as known to one skilled in the art. Further, an associated computer software program product may have one or more executable portions capable of being executed within a computer device and configured to accomplish the corresponding method according to embodiments of the present invention.

Thus, embodiments of the present invention provide the capability of measuring and scheduling the workload of an operation according to multiple project parameters, as well as a mechanism for measuring the productivity of the operation. Embodiments of the present invention further provide a mechanism for analyzing workloads and schedules that are non-linear and/or non-parallel and also provide the capability of simply assessing existing and proposed schedules for conflicts with resource capacity so as to allow control of the input of workload with respect to the schedule. Further embodiments of the present invention also provide a mechanism for scheduling workload at reasonable and sustainable levels relative to available manpower, while also providing the capability of measuring and controlling the growth of an operation and improving operational efficiency by using non-financial measures. Accordingly, embodiments of the present invention provide the capability of determining the cost-value of performing work in house or outsourcing the work to a service provider, wherein further capabilities are provided for developing task specific outsourcing strategies and for effectively negotiating outsourcing prices with service provides. In addition, embodiments of the present invention permit the management and fluid use of resources between internal operational groups. Embodiments of the present invention are also capable of accomplishing the above advantages without requiring a detailed understanding of the interdependencies and relationships between resources and workload necessary to develop complex Work Breakdown Structures (WBS). In addition, embodiments of the present invention do not require linear or parallel workload schedules to be developed, do not require a continuous understanding of the hands-on work time necessary for each task, and do not require the further continuous monitoring of manpower hours. Thus, methods, computer devices, and computer software program products for analyzing workload schedule and productivity, respectively, within a complex process according to embodiments of the present invention provides significant advantages as detailed herein.

BRIEF DESCRIPTION OF THE DRAWINGS

Figure 1:
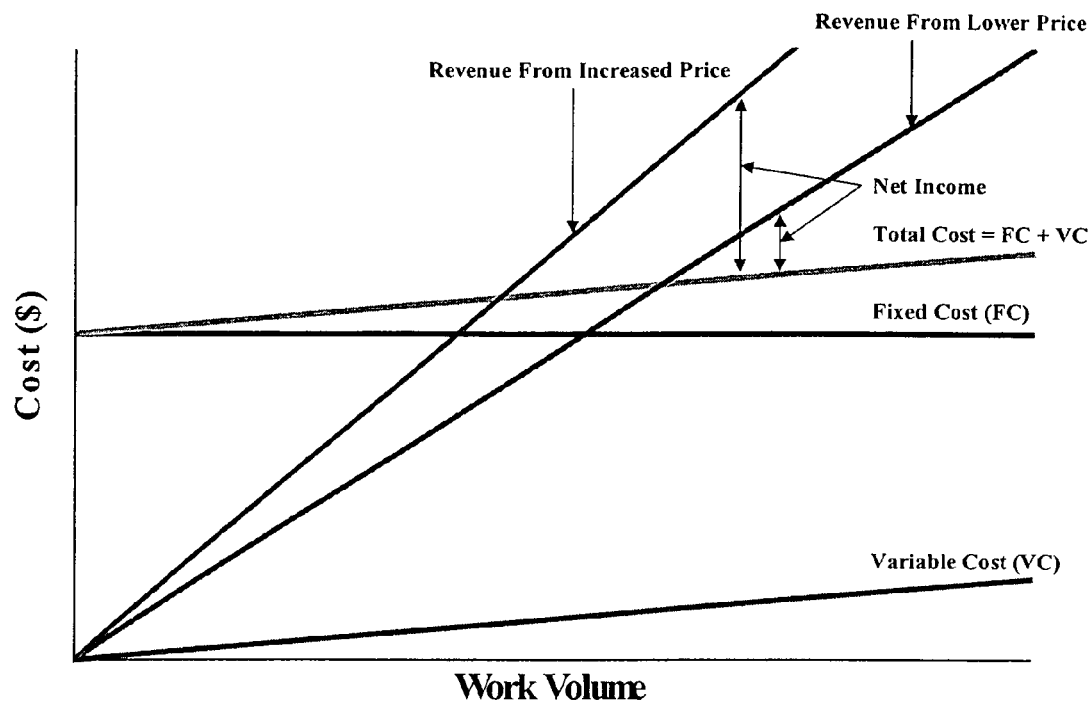

Having thus described the invention in general terms, reference will now be made to the accompanying drawings, which are not necessarily drawn to scale, and wherein:

FIG. 1 is a chart illustrating a fixed cost business model for a provider of complex services.

Figure 2:
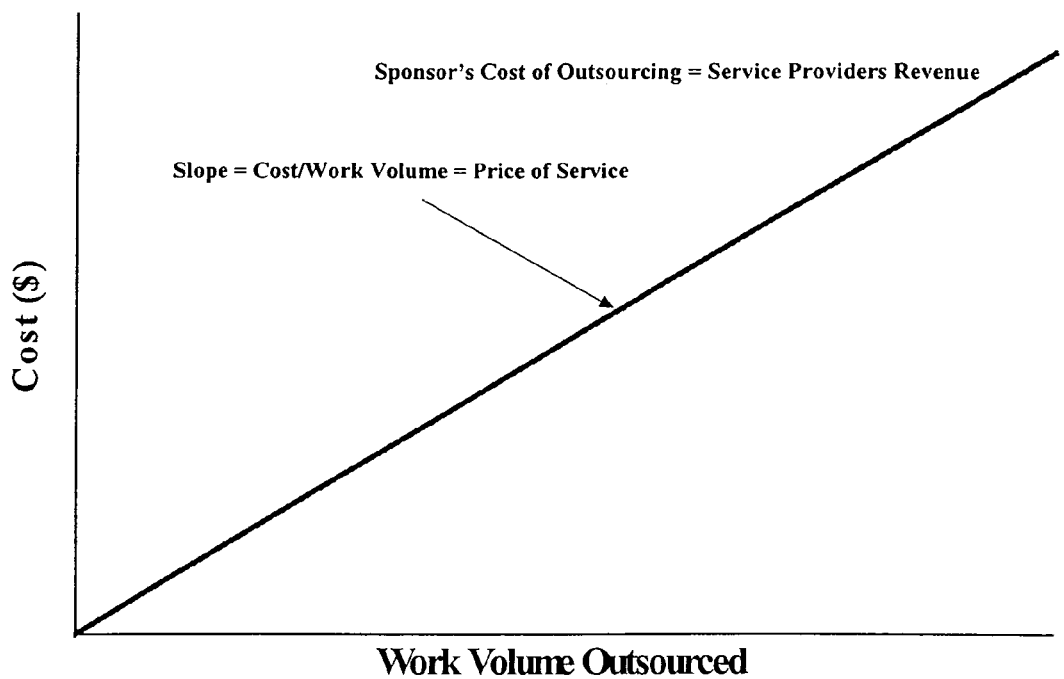

FIG. 2 is a chart illustrating a sponsor's cost of outsourcing work to a service provider.

Figure 3:
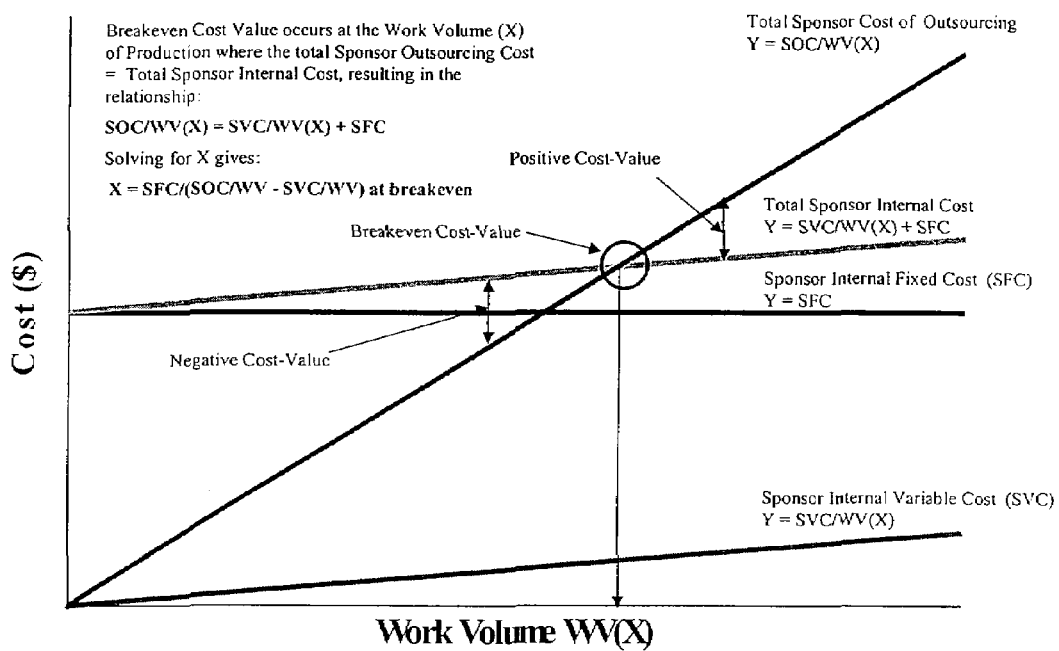

FIG. 3 is a chart illustrating a sponsor's cost-value analysis of outsourcing as compared to in-house performance of the work.

Figure 4:
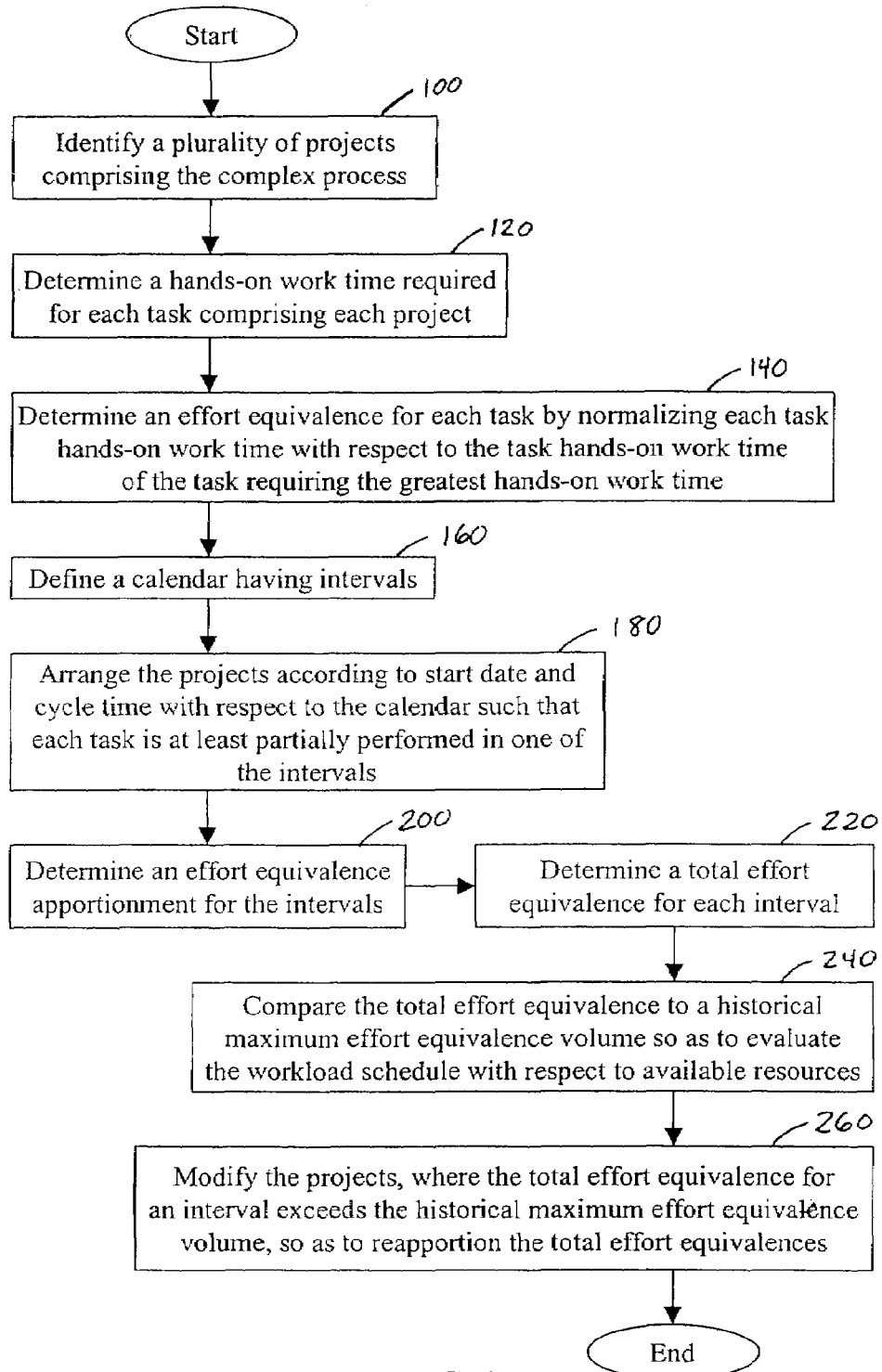

FIG. 4 is a flowchart illustrating a method of analyzing a workload schedule for a complex process with respect to the resources available therefor according to one embodiment of the present invention.

FIG. 5 is a chart illustrating an analysis of effort equivalences for a scheduled work volume over a calendar period according to one embodiment of the present invention.

Figure 6:
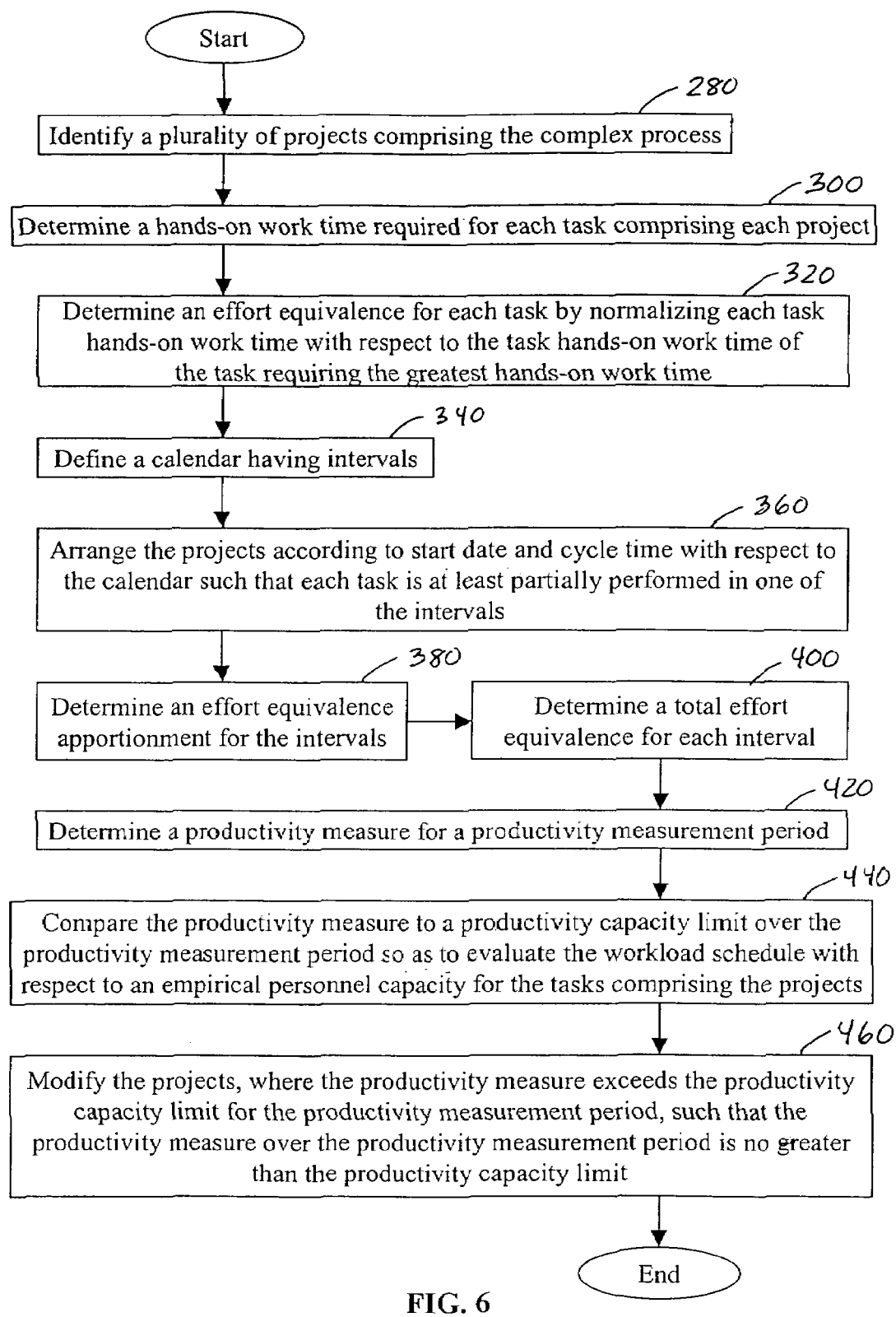

FIG. 6 is a flowchart illustrating a method of analyzing productivity within a complex process with respect to a workload schedule being performed by a total production FTE worker headcount according to one embodiment of the present invention.

FIG. 7 is a chart illustrating an analysis of productivity for a scheduled work volume over a calendar period according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In the analysis of a complex process, several parameters may be beneficial in interpreting the relative efficiency in the utilization of resources. For example, Scheduled Work Volume is generally referred to as "workload" and may be useful in analyzing resource availability and utilization with respect thereto, wherein resources represent, for example, equipment, materials, and supplies. In addition, Productivity, or workload divided by the number of FTE performing the work divided by the period of time in which the work is performed, may be useful in comparing the scheduled workload with the capacity of the personnel performing the scheduled processes. An FTE is, for example, a worker scheduled to work "hands-on" for Full Time Equivalent (FTE) hours. In other words, an FTE is one headcount or personnel unit, typically working 2080 hours per year, including holidays, vacation, and sick leave. Therefore, the initial step of the analysis involves transforming the "scheduled workload" into a manageable format.

A workload often involves one or more projects, with each project comprising one or more tasks. It follows that one of the simplest approaches to analyzing volume/productivity would be to measure how many tasks are performed over a defined time period, such as a month, or how many items are processed through each task. However, since the FTE effort required to complete each task may vary dramatically from task to task, such measures may give widely varying volume/productivity results that may be significantly influenced by the nature of the work. For example, volume/productivity may seem to be high in months where numerous "easy" tasks were performed relative to months where numerous "difficult" tasks were performed.

Another approach to transforming a "scheduled workload" into a manageable format involves measuring how FTE hours are used. Since personnel costs may represent one of the most significant costs in a fixed cost business, and since the availability of FTE hours to perform the work helps to define the capacity of the operation, the use of FTE hours is a primary concern. Thus, an important aspect of volume/productivity analysis is the measure of how FTE hours are used. A typical approach involves continuous monitoring of the FTE utilization. However, the continuous monitoring of FTE hour utilization data (typically timecards) requires significant overhead and attention to accurately maintain.

Thus, as shown in FIG. 4, one of the first steps in analyzing a complex process with respect to work volume and productivity according to one embodiment of the present invention involves identifying the projects comprising the complex process (block 100). Each project may further comprise one or more individual tasks. Accordingly, once the projects have been identified and the respective tasks determined, a representative determination of the hands-on work time required for each task is implemented (block 120) in terms of the hands-on FTE hours required. The hands-on work time required for each task is then normalized on a scale of 1 to n with respect to the task having the greatest required hands-on work time (block 140) to thereby provide a unit-less measure of effort, also referred to herein as a "hands-on Effort Equivalence (EEq)," that may be used, for example, to measure work volume and productivity. As will be further described and become more apparent herein, the use of a unit-less measure of effort such as the EEq balances or otherwise equalizes the volume/productivity measure with respect to the variations in effort required to perform the different tasks. That is, the EEq concept substantially eliminates the need to continually monitor the hands-on work time required for each task, as required by other prior art processes, since the relative effort of each task is analyzed with respect to the maximum hands-on work time required for the respective project, represented by the task having the greatest required hands-on work time.

Though described in detail herein, a method of analyzing a complex process with respect to work volume and productivity according to one embodiment of the present invention may be further illustrated by way of example. Accordingly, once the tasks comprising the project have been identified (block 100), an analysis of the hands-on work time required for each task (block 120) is performed. This analysis can be accomplished, for instance, by analyzing the time expended for each step of the task with respect to the required hands-on FTE effort. Such an analysis is shown, for example, in Table 1. Note that, according to one embodiment of the present invention, an automated process does not require any hands-on FTE time since the FTE is able to perform other tasks during this period. Accordingly, no time is allocated to an automated process step of a task. A similar analysis is also performed for other tasks performed for a project and, if necessary, for tasks within other projects performed as part of the internal process of the organization.

TABLE 1

Measuring Hands-On FTE Time for each step of the task.
Task 1

| Step | Hands-On Time (hrs) |
|---|---|
| 1. Prepare equipment | 1.0 |
| 2. Prepare study material | 3.5 |
| 3. Set up data base | 0.50 |
| 4. Run automated process | 0.00 |
| 5. Generate report | 1.5 |
| 6. Review results | 1.5 |
| Total Hands On Time | 8.0 |

Once the total hands-on FTE time is determined for each task, the EEq for each task in the project is calculated, for example, as the ratio of total hands-on FTE time (hrs) of each task to the task requiring the greatest amount of hands-on FTE time (block 140), as shown in Table 2.

TABLE 2

Calculation of Effort Equivalences (EEq)
Calculation of EEq

| Task | Hands-On Time (hrs) | Normalized Hands-On Time | EEq (1 – n) |
|---|---|---|---|
| Task 1 | 8 | 8/8 = 1.00 | 100 |
| Task 2 | 6 | 6/8 = 0.75 | 75 |
| Task 3 | 4.5 | 4.5/8 = 0.56 | 56 |
| Task 4 | 2.5 | 2.5/8 = 0.31 | 31 |
| Task 5 | 0.5 | 0.5/8 = 0.06 | 6 |

In a representative operation, the various projects comprising the operation may be scheduled according to a variety of parameters, wherein, for example, various projects may overlap, may be performed simultaneously or consecutively, or be separated by periods of time. Accordingly, once the various projects comprising the operation have been determined, an appropriate calendar having defined intervals is established (block 160). The projects are then applied to the calendar according to the respective start dates and cycle times such that each project is at least partially performed in at least one of the intervals (block 180). By arranging the project information in such a manner, the workload schedule for the operation is tabulated. Note that, in this instance, the described method has been described in generic terms, independent of parameters affecting any specific industry. It will therefore be understood by one skilled in the art that the methodology described herein is applicable to any industry capable of having the internal processes separated into projects, tasks, or multiple levels or combinations thereof according to the spirit and the scope of the present invention.

The above concepts are further illustrated by example as shown in Table 3, wherein a partial schedule for the first four months of a year (in this example, 1998) is established for 8 projects, each scheduled to begin at different times and each using different combinations of 5 tasks. Note that the chosen parameters have been selected for example only and should not be construed as limiting the applicability of the methods described herein according to embodiments of the present invention. In further detail for the presented example, Project 1 has a required start date of Jan. 1, 1998 and requires that all five tasks be performed. Project 2 has a start date of Jan. 15, 1998 and requires that only tasks 1, 3, and 5 be performed. The start dates and task combinations for the respective remaining projects are further shown in Table 3.

In determining the scheduled workload, the cycle time (the length of hands-on work time required for all tasks for a given project or, in some instances, the longest length of time required for a task or established project completion deadlines) and the total number of Effort Equivalences (EEq) for each task must be considered in order to assess how the workload is allocated within the schedule. Accordingly, the effort equivalences must be apportioned with respect to the intervals within the calendar (block 200). For example, Project 1 has a 30-day cycle time, and thus the EEq for each task are scheduled entirely in the month of January. Project 2, on the other hand, does not begin until January 15, and thus, with a 30-day cycle time, half the workload is allocated to January, and the remaining half is allocated to February. As further shown in Table 3, similar allocation of workload is applied to all projects and associated tasks to obtain a more extensive representation of the EEq apportionment over the respective intervals. Once the EEq's are apportioned, the total EEq apportionment for each interval is determined, wherein such intervals comprise individual months in this instance, by summing the EEq portion for each project falling within each respective interval (block 220). Accordingly, the extent of the schedule of workload EEq's across each interval may vary considerably and comprise as many future intervals as there is work scheduled.

EEq AAV and the actual workload capacity of an operation, management analysis of staff morale, staff performance, resource/material availability, and work output quality must occur. Upon collecting the appropriate combination of actual accrued EEq AAV and corresponding management information, the impact of peak workloads may be assessed with respect to the volume of EEq performed during that peak to determine, for example, the actual workload capacity. In

TABLE 3

Building a Workload EEq Schedule.

| Project | Task | Start Date | Cycle Time | EEq | January 1998 Scheduled EEq | February 1998 Scheduled EEq | March 1998 Scheduled EEq | April 1998 Scheduled EEq |
|---|---|---|---|---|---|---|---|---|
| Project 1 | Task 1 | 1-Jan | 30 | 1000 | 1000 | | | |
| Project 1 | Task 2 | 1-Jan | 30 | 750 | 750 | | | |
| Project 1 | Task 3 | 1-Jan | 30 | 560 | 560 | | | |
| Project 1 | Task 4 | 1-Jan | 30 | 310 | 310 | | | |
| Project 1 | Task 5 | 1-Jan | 30 | 60 | 60 | | | |
| Project 2 | Task 1 | 15-Jan | 30 | 1000 | 500 | 500 | | |
| Project 2 | Task 3 | 15-Jan | 30 | 560 | 280 | 280 | | |
| Project 2 | Task 5 | 15-Jan | 30 | 60 | 30 | 30 | | |
| Project 3 | Task 2 | 1-Feb | 30 | 750 | | 750 | | |
| Project 3 | Task 4 | 1-Feb | 30 | 310 | | 310 | | |
| Project 4 | Task 1 | 15-Feb | 30 | 1000 | | 500 | 500 | |
| Project 4 | Task 2 | 15-Feb | 30 | 750 | | 375 | 375 | |
| Project 4 | Task 3 | 15-Feb | 30 | 560 | | 280 | 280 | |
| Project 5 | Task 3 | 1-Mar | 30 | 560 | | | 560 | |
| Project 5 | Task 4 | 1-Mar | 30 | 310 | | | 310 | |
| Project 5 | Task 5 | 1-Mar | 30 | 60 | | | 60 | |
| Project 6 | Task 1 | 15-Mar | 30 | 1000 | | | 500 | 500 |
| Project 6 | Task 2 | 15-Mar | 30 | 750 | | | 375 | 375 |
| Project 6 | Task 3 | 15-Mar | 30 | 560 | | | 280 | 280 |
| Project 6 | Task 4 | 15-Mar | 30 | 310 | | | 155 | 155 |
| Project 6 | Task 5 | 15-Mar | 30 | 60 | | | 30 | 30 |
| Project 7 | Task 1 | 1-Apr | 30 | 1000 | | | | 1000 |
| Project 7 | Task 4 | 1-Apr | 30 | 310 | | | | 310 |
| Project 7 | Task 5 | 1-Apr | 30 | 60 | | | | 60 |
| Project 8 | Task 2 | 15-Apr | 30 | 750 | | | | 375 |
| Project 8 | Task 3 | 15-Apr | 30 | 560 | | | | 280 |
| Project 8 | Task 5 | 15-Apr | 30 | 60 | | | | 30 |
| | | | | Total | 3490 | 3025 | 3425 | 3395 |

Once the scheduled workload has been tabulated as shown in Table 3, the corresponding data may be more readily interpreted by establishing a graphical representation of the total EEq's scheduled to be performed for each interval, representing the EEq volume, versus the calendar of intervals (individual months of the year, in this instance).

As shown in FIG. 5, a further example depicts an operation's schedule of EEq volume SV (determined according to the methodology previously described) and the actual accrued EEq volume AAV. The scheduled EEq SV may vary with respect to the actual accrued EEq volume AAV for a variety of reasons such as, for example, unexpected delays for certain tasks or the addition of unexpected work. The actual accrued EEq AAV is determined by, for example, collecting information on the actual percent of work completed for each task at the end of each calendar interval. For example, as shown in Table 3, Project 1 has five tasks scheduled to be completed in January. However, if Task 1 of Project 1 encounters unexpected delays (for example, instrument failure), that task may only be 80% complete at the end of January, and thus would only accrue an actual EEq of 0.80*1,000=800 EEq instead of the scheduled 1,000 EEq. To evaluate the relationship between the total actual accrued other words, the total EEq for an interval can be compared to a historical maximum EEq volume for the process so as to evaluate the workload schedule with respect to available resources (block 240), wherein the historical maximum EEq volume is determined, for example, according to a historical analysis of actual accrued EEq volume over a previous corresponding period.

Accordingly, in the example presented in FIG. 5, the scheduled operation indicates that a maximum volume of 4000 EEq was attained in August and September of 1997. During that period of time, for example, management observed that a good quality of work was achieved, but the process experienced more than 20% greater overtime hours being logged and queues were forming for portions of the process involving critical equipment. In such an instance, management may establish a benchmark maximum volume of, for example, 4000 EEq as representative of the historical maximum workload or volume HM capable of being handled by the operation. Accordingly, by examining the example 1998 schedule shown in FIG. 5, it is apparent that the scheduled EEq volume SV exceeds the estimated capacity of the process (the historical maximum EEq volume HM) in the May, June, and October intervals. In practical terms, exceeding the process capacity during these months may result in a shortage of manpower, materials, supplies, equipment, and/or space necessary to complete the scheduled work. As such, management is then able to modify the projects, with particular attention to the intervals in which the scheduled EEq volume SV exceeds the estimated capacity HM of the process, so as to reapportion the EEq's across the intervals and prospectively alleviate and/or remedy the identified capacity issue (block 260). For example, the start dates of projects could be adjusted to move some of the work into April, or some start dates could be delayed in order to transfer some of the work into July. A similar process could be performed, for instance, to more evenly balance the workload schedule from September through November. Note that, in an alternative embodiment, the available resources (in terms of manpower, materials, supplies, equipment, and/or space) may be appropriately increased, decrease, or otherwise adjusted to address the scheduled work. In either instance, the EEq's are essentially reapportioned across the intervals to balance the workload and address process capacity issues.

Thus, the methodology, as described, implements actual EEq volume measurements, combined with management observations of performance within the operation, to determine the practical workload capacity of the operation. Where necessary, the projects are modified so as to reapportion the EEq's across the intervals and prospectively alleviate and/or remedy identified capacity issues. On the other hand, if the scheduled workload remains below the historical maximum EEq volume (the operation's capacity), a detailed analysis of resource availability does not need to be performed. However, it will be realized by one skilled in the art that, in such an instance, a modification of the projects comprising the process may still be performed so as to address potential underutilization of the available resources, according to the spirit and the scope of the present invention.

According to another advantageous aspect of the present invention, the EEq information determined according to the procedure described herein may be analyzed in terms of productivity as well as workload schedule (work volume). Productivity is defined as the total EEq volume divided by the total production FTE worker headcount supporting the work, divided by a period of time over which productivity is measured (e.g., EEq/FTE/month). Accordingly, a distinction between volume and productivity in resource management is that volume, for example, provides information comparing scheduled workload with available resources, such as equipment, materials, and supplies, while productivity, for example, provides information that compares scheduled workload with the capacity of the personnel responsible for the work and with respect to the processes currently utilized therefor.

FIG. 6 illustrates such a method in which the determination of the EEq apportionment occurs in a similar manner as already described herein. As such, once the projects comprising the complex process have been identified (block 280), the hands-on time required for each task comprising each project is then determined (block 300). Thereafter, an EEq for each task is determined by normalizing each task hands-on time with respect to the task hands-on time of the task having the greatest required hands-on time (block 320). Once an appropriate calendar defining intervals is established (block 340), the projects are arranged according to the respective start dates and cycle times, and with respect to the calendar, such that each task is performed in at least one of the intervals defined by the calendar (block 360). Accordingly, the EEq apportionment for the intervals is determined (block 380) before the total EEq for each interval is computed (block 400).

At this point, a productivity measure can be determined for a particular productivity measurement period (block 420). In furtherance of the example as described with respect to FIGS. 4 and 5, it can be assumed, for example, that five FTE (a headcount of 5 workers) are performing the scheduled work. Accordingly, as shown in FIG. 7, the productivity (based on the corresponding EEq information) is represented as EEq/FTE for particular intervals by dividing the EEq volume for each month interval by five FTE. Since the volume capacity of the operation (based on a historical analysis of actual accrued EEq volume over a previous corresponding period) was previously determined to be 4000 EEq (August/September, 1997), and since five FTE were presumed to perform the work, a maximum work pace (maximum productivity or productivity capacity limit PCL) for each worker may be established as, for example, 4000 EEq/5 FTE=800 EEq/FTE per interval. A similar analysis is also performed with respect to the scheduled EEq volume and the actual accrued EEq volume to produce a graphical representation of scheduled productivity SP and actual accrued productivity AAP, respectively, as shown in FIG. 7. Note that the chosen interval may be a length of time other than a month, as shown in this example, so as to be consistent with the needs of the particular analysis being performed.

In some instances, management observations may affect the maximum productivity levels of the workers performing the processes comprising the operation, such observations including, for example, staff working hours, staff morale, and the timeliness of project results. In practical terms, if the operation had an excess availability of physical resources (equipment and supplies), the operation could schedule more work than the workers could perform using the existing processes comprising the operation. However, if the established productivity capacity limit were exceeded for a prolonged period of time, the complexity of worker's schedule would be increased and each worker would essentially be compelled to work longer hours, possibly on a wider array of tasks and projects, in order to address the scheduled workload. As such, possible effects of exceeding the productivity capacity limit for prolonged periods would be, for example, increased worker stress and dissatisfaction, lack of focus on task details, poor work output quality, missed deadlines, decreased morale, and increased staff turnover.

As further shown in FIG. 7, the example 1998 schedule, as before, indicates capacity issues arising in June, July, and October. These months present a schedule that exceeds the productivity capacity limit PCL of the operation and, according to one embodiment of the present invention, a schedule which exceeds the "80% of capacity" scheduling guideline, an empirical personnel capacity EPC of a process as known to one skilled in the art. The "80% of capacity" guideline suggests that an operations schedule should never exceed 80% of capacity in order to, for example, maximize the flexibility of the operation to handle "rush" or unexpected work. Such a guideline also provides, for instance, time for staff to undergo training and for process improvement by the operation. According to this guideline, if the scheduled work continually exceeds 80% of operational capacity, morale and turnover issues may, for instance, arise within the operation. In addition, the operation's decreased flexibility to handle "rush" critical path projects may increase the length of the queue of projects awaiting service. The increased project queue would cause, for example, increased project development costs due to delays in dependent critical path functions such as manufacturing or the submission of regulatory documents leading to the introduction of new products to the market. Thus, the empirical personnel capacity provides a conservative measure by which to evaluate productivity in relation to the productivity capacity limit so as to provide a reasonable work pace for the affected staff.

Therefore, in other words, once the productivity measure for a productivity measurement period has been determined, the productivity measure is compared to the productivity capacity limit over that productivity measurement period so as to evaluate the workload schedule with respect to the empirical personnel capacity for the tasks comprising the projects (block 440). Thereafter, where the productivity measure exceeds the productivity capacity limit for the productivity measurement period, the projects may be modified such that the productivity measure over the productivity measurement period is no greater than the productivity capacity limit (block 460). In some instances, according to one embodiment of the present invention, the productivity measure for a productivity measurement period may be compared to the empirical personnel capacity in order to provide a more conservative reference of the work pace imparted to the staff as a result of the scheduled work. To avoid such detrimental issues regarding productivity within the process, for instance, FTE (worker headcount) could be increased, processes improved, or projects otherwise adjusted to bring the scheduled workload back within the productivity capacity limit.

Therefore, according to this advantageous aspect of the present invention, monitoring of productivity allows an operation to compare the scheduled workload with the available human resources (assuming continued implementation of existing processes) so as to appropriately control the workload input to the process. By closely monitoring productivity, an operation can control the input of workload into the process schedule in order to maintain the schedule at a reasonable pace of work for the staff such as, for example, at 80% of capacity or in other manners with respect to the productivity capacity limit. In addition, controlling the input of work so as to provide a reasonable work pace allows the operation to more easily manage "rush" work, unexpected or otherwise unscheduled additional work, or other process anomalies, should the situation so arise. Thus, monitoring productivity may allow an operation to, for example, determine when additional headcount can be justified or measure the impact of process improvements on operational efficiency.

The methods presented herein by way of example use simple projects with 30-day cycle times and start dates at either the beginning or middle of each month for convenience and facilitation of illustration. However, it will be realized by one skilled in the art that such methods as presented may be applied to operation schedules that are much more complex wherein, for instance, a project may be used for multiple types of input materials, each processed by different tasks. Further, for example, the start dates may vary and, in some instances, may be the adjusted parameter used to balance the distribution of workload in order to more effectively use existing and available resources. In addition, the tasks may also add complexity to the model, wherein, for example, the tasks may be project specific and there may be many different tasks that must be performed for each project within the process. Still further, an increased number of variables within a process contributes greatly to the complexity thereof, and thereby imparts a high degree of difficulty to the scheduling of such work. Accordingly, one skilled in the art will appreciate that the methods as described herein provide novel mechanisms for compiling this complex process information into a readily interpretable format. As such, managers or other process analysts are alerted to potential workload and capacity conflicts within the process with enough advanced warning to remedy the situation before disruptions of the process or other problems arise therefrom. In addition, though the methods as presented herein are capable of transforming complex process information into a readily interpretable format, complex and detailed Work Breakdown Structure analysis is not required. The described methods are also capable of assessing complex, non-linear schedules with minimal maintenance overhead (simple data input, and relatively simple database programming). Thus, workload schedules may be readily projected and managed, production may be tracked, resource availability may be analyzed, internal resources may be fluidly meted between internal operational groups, and the cost effectiveness of outsourcing all or a portion of work to be performed may be determined.

One skilled in the art will also appreciate that the methods described herein according to embodiments of the present invention may be realized as automated methods implemented on appropriately configured computer device with corresponding software. Accordingly, other advantageous aspects of the present invention comprise a system, further comprising a computer device, and a computer software program product capable of being executed within a computer device, wherein both aspects are configured according to, and are capable of implementing, both a method of analyzing a workload schedule for a complex process with respect to the resources available therefor, and a method of analyzing productivity within a complex process with respect to a workload schedule being performed by a total production FTE worker headcount, respectively, as described herein. Such computer devices may be implemented in computer hardware, or a combination of computer software and hardware, having one or more processing portions for accomplishing an associated method according to embodiments of the present invention. Accordingly, a computer device may comprise, for example, a desktop personal computer, a laptop personal computer, a server, a router, a mainframe computer, or like devices or combinations thereof capable of implementing the described functions as known to one skilled in the art. Further, an associated computer software program product may have one or more executable portions capable of being executed within a computer device and configured to accomplish the corresponding method according to embodiments of the present invention.

Thus, embodiments of the present invention provide the capability of measuring and scheduling the workload of an operation according to multiple project parameters, as well as a mechanism for measuring the productivity of the operation. Embodiments of the present invention further provide a mechanism for analyzing workloads and schedules that are non-linear and/or non-parallel and also provide the capability of simply assessing existing and proposed schedules for conflicts with resource capacity so as to allow control of the input of workload with respect to the schedule. Further embodiments of the present invention also provide a mechanism for scheduling workload at reasonable and sustainable levels relative to available manpower, while also providing the capability of measuring and controlling the growth of an operation and improving operational efficiency by using non-financial measures.

Accordingly, embodiments of the present invention provide the capability of determining the cost-value of performing work in-house or outsourcing the work to a service provider, wherein further capabilities are provided for developing task specific outsourcing strategies and for effectively negotiating outsourcing prices with service provides. For example, once the actual accrued EEq volume is determined for an internal operation during a given calendar interval, it is a relatively simple matter to calculate the internal operation's cost-value relative to outsourcing the same volume of work. To accomplish this calculation, the price charged by an external service provider to perform each task currently being performed by the internal operation must be ascertained. The pricing information is then analyzed with respect to the estimated EEq required for each task to provide the cost per EEq for each task (or permitting the calculation of average cost per EEq for all tasks). Next, during the course of each calendar interval, the total actual accrued EEq volume is recorded, for instance, in total or per task. The resulting actual accrued EEq is then multiplied by the cost per EEq established for each task (or the average cost per EEq for all tasks), thereby providing the total cost that would have been accrued if that work volume is performed by the service provider, instead of being performed internally by the operation. Finally, since the total cost of the work volume at issue for each calendar interval is known to or easily determinable by the internal operation, the total internal cost of performing the measured and actually accrued EEq, as previously determined for the service provider, is readily calculated. Thereafter, the cost-value of the actual accrued EEq performed during the calendar interval is calculated by subtracting the actual internal cost for the work from the calculated cost of performing the same work through a service provider. If the resulting number is positive (i.e. the service provider cost is greater than the internal cost), the positive cost-value represents costs that are saved by performing the work internally, rather than outsourcing. Accordingly, if the number is negative, the cost-value thus indicates that costs would be saved by outsourcing the work.

Moreover, in addition, embodiments of the present invention permit the management and fluid use of resources between internal operational groups. Embodiments of the present invention are also capable of accomplishing the above advantages without requiring a detailed understanding of the interdependencies and relationships between resources and workload necessary to develop complex Work Breakdown Structures (WBS). In addition, embodiments of the present invention do not require linear or parallel workload schedules to be developed, do not require a continuous understanding of the hands-on time necessary for each task, and do not require the further continuous monitoring of manpower hours.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of analyzing and optimizing productivity within a complex process with respect to a workload schedule being performed by a total production full-time equivalent (FTE) worker headcount, said method comprising:

identifying a plurality of projects comprising the complex process, each project having a start date and a cycle time and further comprising at least one task;

determining a hands-on work time required for each task, the tasks including a task requiring a greatest hands-on work time;

determining an effort equivalence for each task by normalizing each task hands-on work time with respect to the task hands-on work time of the task requiring the greatest hands-on work time;

defining a calendar having intervals;

arranging the projects according to the start date and the cycle time and with respect to the calendar such that each task is at least partially performed in one of the intervals;

determining an effort equivalence apportionment for the intervals corresponding to the tasks at least partially performed in respective intervals;

determining a total effort equivalence for each interval corresponding to the sum of the effort equivalence apportionment for the tasks at least partially performed in that interval;

determining a productivity measure for a productivity measurement period by dividing the total effort equivalence by the total production FTE worker headcount and the productivity measurement period, the productivity measurement period comprising at least a portion of an interval;

comparing the productivity measure to a productivity capacity limit over the productivity measurement period, the productivity capacity limit comprising at least a percentage of a historical maximum productivity capacity with respect to the resources available therefor, so as to evaluate the workload schedule with respect to an empirical personnel capacity for the tasks comprising the projects; and modifying the projects, where the productivity measure exceeds the productivity capacity limit for the productivity measurement period, such that the productivity measure over the productivity measurement period is no greater than the productivity capacity limit so as to thereby provide a relatively more efficient utilization of the empirical personnel capacity for the tasks comprising the projects with respect to the workload schedule.

2. A method according to claim 1 wherein comparing the productivity measure further comprises comparing the productivity measure to a productivity capacity limit, the productivity capacity limit comprising about 80 percent of the historical maximum productivity capacity, over the productivity measurement period.

3. A method according to claim 1 further comprising determining the empirical personnel capacity for the tasks comprising the projects with respect to the workload schedule by evaluating at least one of personnel working hours, personnel morale, and project result timeliness with respect to the historical maximum productivity capacity.

4. A method according to claim 1 wherein modifying the projects further comprises modifying the arrangement of the projects with respect to the calendar so as to reapportion the total effort equivalences across the intervals.

5. A method according to claim 1 wherein modifying the projects further comprises modifying the available resources such that the modified available resources correspond to the total equivalence effort for each interval regardless of the productivity capacity limit.

6. A method according to claim 1 wherein modifying the projects further comprises modifying the total production FTE worker headcount so as to modify the productivity measure with respect to the productivity capacity limit.

7. A method according to claim 1 wherein the tasks are each performed according to a corresponding process and modifying the projects further comprises modifying the processes so as to modify the productivity measure with respect to the productivity capacity limit.

8. A method according to claim 1 wherein defining a calendar further comprises defining a calendar extending for a period corresponding to the workload schedule.

9. A method according to claim 1 wherein determining a hands-on work time required for each task further comprises determining a hands-on work time required for each task such that an automated task is designated as requiring no hands-on work time.

10. A method according to claim 1 wherein determining a hands-on work time required for each task further comprises determining a hands-on work time required for each task by performing a single representative time measurement of the hands-on work required for each task.

11. A method according to claim 1 wherein determining an effort equivalence for each task further comprises normalizing each task hands-on work time with respect to the task hands-on work time of the task requiring the greatest hands-on work time to provide a corresponding unit-less measure of effort that relatively balances variations in effort for each task so as to substantially eliminate a need to continually monitor the hands-on work time required for each task.

12. A method according to claim 1 further comprising determining the historical maximum productivity capacity by dividing the total effort equivalence over a corresponding productivity measurement period in a previous calendar by the total production FTE worker headcount performing the tasks over the corresponding interval in the previous calendar, the total effort equivalence over the corresponding productivity measurement period further comprising an actual accrued total effort equivalence.

13. A method according to claim 1 further comprising, where the productivity measure does not exceed the productivity capacity limit for the productivity measurement period, maintaining the arrangement of the projects according to the start date and the cycle time and with respect to the calendar.

14. A computer system for analyzing productivity within a complex process with respect to a workload schedule being performed by a total production full-time equivalent (FTE) worker headcount, said computer system comprising:
   a first processing device configured to identify a plurality of projects comprising the complex process, each project having a start date and a cycle time and further comprising at least one task;
   a second processing device configured to determine a hands-on work time required for each task, the tasks including a task requiring a greatest hands-on work time;
   a third processing device configured to determine an effort equivalence for each task by normalizing each task hands-on work time with respect to the task hands-on work time of the task requiring the greatest hands-on work time;
   a fourth processing device configured to define a calendar having intervals;
   a fifth processing device configured to arrange the projects according to the start date and the cycle time and with respect to the calendar such that each task is at least partially performed in one of the intervals;
   a sixth processing device configured to determine an effort equivalence apportionment for the intervals corresponding to the tasks at least partially performed in respective intervals;
   a seventh processing device configured to determine a total effort equivalence for each interval corresponding to the sum of the effort equivalence apportionment for the tasks at least partially performed in that interval;
   an eighth processing device configured to determine a productivity measure for a productivity measurement period by dividing the total effort equivalence by the total production FTE worker headcount and the productivity measurement period, the productivity measurement period comprising at least a portion of an interval;
   a ninth processing device configured to compare the productivity measure to a productivity capacity limit over the productivity measurement period, the productivity capacity limit comprising at least a percentage of a historical maximum productivity capacity with respect to the resources available therefor, so as to evaluate the workload schedule with respect to an empirical personnel capacity for the tasks comprising the projects; and
   a tenth processing device configured to direct the modification of the projects, where the productivity measure exceeds the productivity capacity limit for the productivity measurement period, such that the productivity measure over the productivity measurement period is no greater than the productivity capacity limit so as to thereby provide a relatively more efficient utilization of the empirical personnel capacity for the tasks comprising the projects with respect to the workload schedule.

15. A computer system according to claim 14 wherein the ninth processing device is further configured to compare the productivity measure to a productivity capacity limit, the productivity capacity limit comprising about 80 percent of a historical maximum productivity capacity, over the productivity measurement period.

16. A computer system according to claim 14 further comprising an eleventh processing device configured to determine the empirical personnel capacity for the tasks comprising the projects with respect to the workload schedule by evaluating at least one of personnel working hours, personnel morale, and project result timeliness with respect to the historical maximum productivity capacity.

17. A computer system according to claim 14 wherein the tenth processing device is further configured to direct the modification of the arrangement of the projects with respect to the calendar so as to reapportion the total effort equivalences across the intervals.

18. A computer system according to claim 14 wherein the tenth processing device is further configured to direct the modification of the available resources such that the modified available resources correspond to the total equivalence effort for each interval regardless of the productivity capacity limit.

19. A computer system according to claim 14 wherein the tenth processing device is further configured to direct the modification of the total production FTE worker headcount so as to modify the productivity measure with respect to the productivity capacity limit.

20. A computer system according to claim 14 wherein the tasks are each performed according to a corresponding process and the tenth processing device is further configured to direct the modification of the processes so as to modify the productivity measure with respect to the productivity capacity limit.

21. A computer system according to claim 14 wherein the fourth processing device is further configured to define a calendar extending for a period corresponding to the workload schedule.

22. A computer system according to claim 14 wherein the second processing device is further configured to determine a hands-on work time required for each task such that an automated task is designated as requiring no hands-on work time.

23. A computer system according to claim 14 wherein the second processing device is further configured to determine a hands-on work time required for each task by directing a performance of a single representative time measurement of the hands-on work required for each task.

24. A computer system according to claim 14 wherein the third processing device is further configured to normalize each task hands-on work time with respect to the task hands-on work time of the task requiring the greatest hands-on work time to provide a corresponding unit-less measure of effort that relatively balances variations in effort for each task so as to substantially eliminate a need to continually monitor the hands-on work time required for each task.

25. A computer system according to claim 14 further comprising a twelfth processing device configured to determine the historical maximum productivity capacity by dividing the total effort equivalence over a corresponding productivity measurement period in a previous calendar by the total production FTE worker headcount performing the tasks over the corresponding interval in the previous calendar, the total effort equivalence over the corresponding productivity measurement period further comprising an actual accrued total effort equivalence.

26. A computer system according to claim 14 wherein the tenth processing device is further configured, where the productivity measure does not exceed the productivity capacity limit for the productivity measurement period, to maintain the arrangement of the projects according to the start date and the cycle time and with respect to the calendar.

27. A computer-readable medium encoded with a computer program capable of being executed within a computer device for analyzing productivity within a complex process with respect to a workload schedule being performed by a total production full-time equivalent (FTE) worker headcount, said computer-readable medium encoded with a computer program comprising:
a first executable portion capable of identifying a plurality of projects comprising the complex process, each project having a start date and a cycle time and further comprising at least one task;
a second executable portion capable of determining a hands-on work time required for each task, the tasks including a task requiring a greatest hands-on work time;
a third executable portion capable of determining an effort equivalence for each task by normalizing each task hands-on work time with respect to the task hands-on work time of the task requiring the greatest hands-on work time;
a fourth executable portion capable of defining a calendar having intervals;
a fifth executable portion capable of arranging the projects according to the start date and the cycle time and with respect to the calendar such that each task is at least partially performed in one of the intervals;
a sixth executable portion capable of determining an effort equivalence apportionment for the intervals corresponding to the tasks at least partially performed in respective intervals;
a seventh executable portion capable of determining a total effort equivalence for each interval corresponding to the sum of the effort equivalence apportionment for the tasks at least partially performed in that interval;
an eighth executable portion capable of determining a productivity measure for a productivity measurement period by dividing the total effort equivalence by the total production FTE worker headcount and the productivity measurement period, the productivity measurement period comprising at least a portion of an interval;
a ninth executable portion capable of comparing the productivity measure to a productivity capacity limit over the productivity measurement period, the productivity capacity limit comprising at least a percentage of a historical maximum productivity capacity with respect to the resources available therefor, so as to evaluate the workload schedule with respect to an empirical personnel capacity for the tasks comprising the projects; and
a tenth executable portion capable of directing the modification of the projects, where the productivity measure exceeds the productivity capacity limit for the productivity measurement period, such that the productivity measure over the productivity measurement period is no greater than the productivity capacity limit so as to thereby provide a relatively more efficient utilization of the empirical personnel capacity for the tasks comprising the projects with respect to the workload schedule.

28. A computer-readable medium encoded with a computer program according to claim 27 wherein the ninth executable portion is further capable of comparing the productivity measure to a productivity capacity limit, the productivity capacity limit comprising about 80 percent of a historical maximum productivity capacity, over the productivity measurement period.

29. A computer-readable medium encoded with a computer program according to claim 27 further comprising an eleventh executable portion capable of determining the empirical personnel capacity for the tasks comprising the projects with respect to the workload schedule by evaluating at least one of personnel working hours, personnel morale, and project result timeliness with respect to the historical maximum productivity capacity.

30. A computer-readable medium encoded with a computer program according to claim 27 wherein the tenth executable portion is further capable of directing the modification of the arrangement of the projects with respect to the calendar so as to reapportion the total effort equivalences across the intervals.

31. A computer-readable medium encoded with a computer program according to claim 27 wherein the tenth executable portion is further capable of directing the modification of the available resources such that the modified available resources correspond to the total equivalence effort for each interval regardless of the productivity capacity limit.

32. A computer-readable medium encoded with a computer program according to claim 27 wherein the tenth executable portion is further capable of directing the modification of the total production FTE worker headcount so as to modify the productivity measure with respect to the productivity capacity limit.

33. A computer-readable medium encoded with a computer program according to claim 27 wherein the tasks are each performed according to a corresponding process and the tenth executable portion is further capable of directing the modification of the processes so as to modify the productivity measure with respect to the productivity capacity limit.

34. A computer-readable medium encoded with a computer program according to claim 27 wherein the fourth executable portion is further capable of defining a calendar extending for a period corresponding to the workload schedule.

35. A computer-readable medium encoded with a computer program according to claim 27 wherein the second executable portion is further capable of determining a hands-on work time required for each task such that an automated task is designated as requiring no hands-on work time.

36. A computer-readable medium encoded with a computer program according to claim 27 wherein the second executable portion is further capable of determining a hands-on work time required for each task by directing a performance of a single representative time measurement of the hands-on work required for each task.

37. A computer-readable medium encoded with a computer program according to claim 27 wherein the third executable portion is further capable of normalizing each task hands-on work time with respect to the task hands-on work time of the task requiring the greatest hands-on work time to provide a corresponding unit-less measure of effort that relatively balances variations in effort for each task so as to substantially eliminate a need to continually monitor the hands-on work time required for each task.

38. A computer-readable medium encoded with a computer program according to claim 27 further comprising a twelfth executable portion capable of determining the historical maximum productivity capacity by dividing the total effort equivalence over a corresponding productivity measurement period in a previous calendar by the total production FTE worker headcount performing the tasks over the corresponding interval in the previous calendar, the total effort equivalence over the corresponding productivity measurement period further comprising an actual accrued total effort equivalence.

39. A computer-readable medium encoded with a computer program according to claim 27 wherein the tenth executable portion is further capable of, where the productivity measure does not exceed the productivity capacity limit for the productivity measurement period, maintaining the arrangement of the projects according to the start date and the cycle time and with respect to the calendar.

* * * * *